J. GODDARD.
MULTIPLYING BACK FOR CAMERAS.
APPLICATION FILED JAN. 28, 1909.
953,005.
Patented Mar. 22, 1910.
3 SHEETS—SHEET 1.
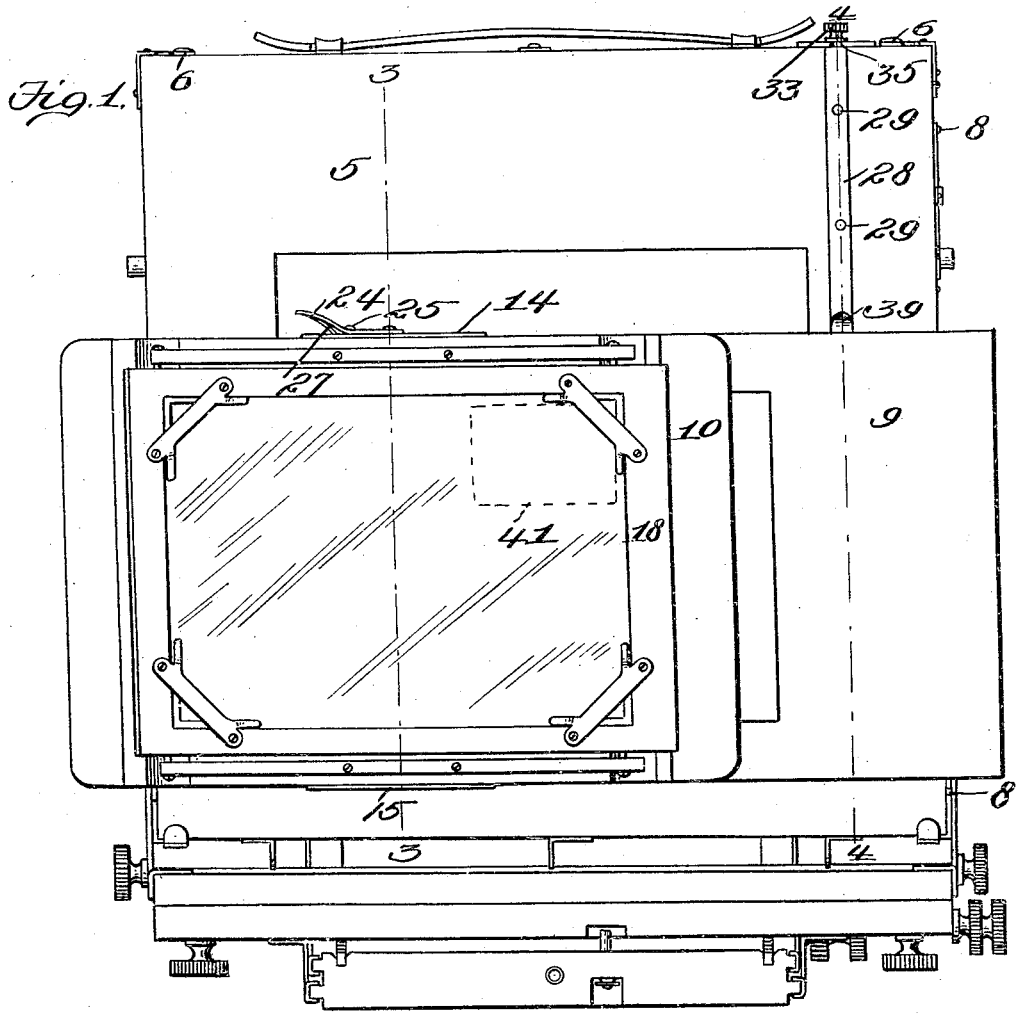
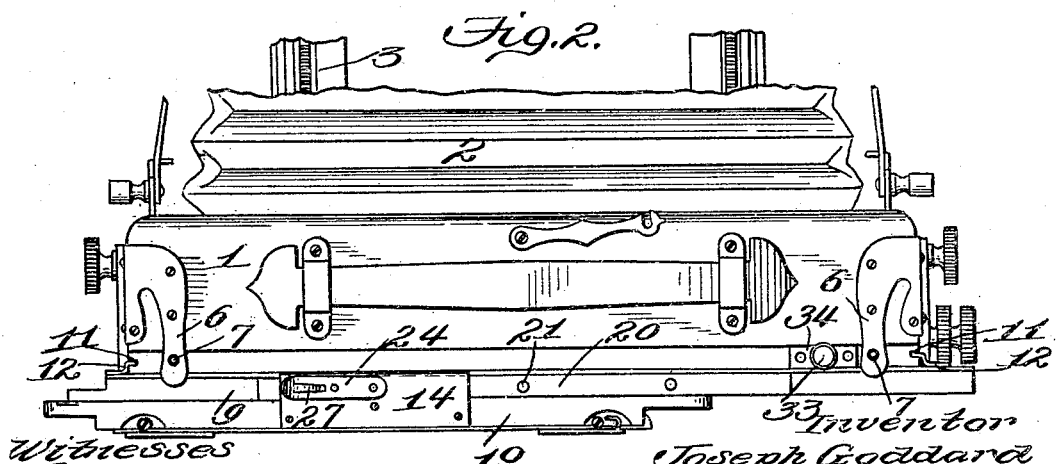
Witnesses
Inventor
Joseph Goddard
By James L. Norris
Atty.

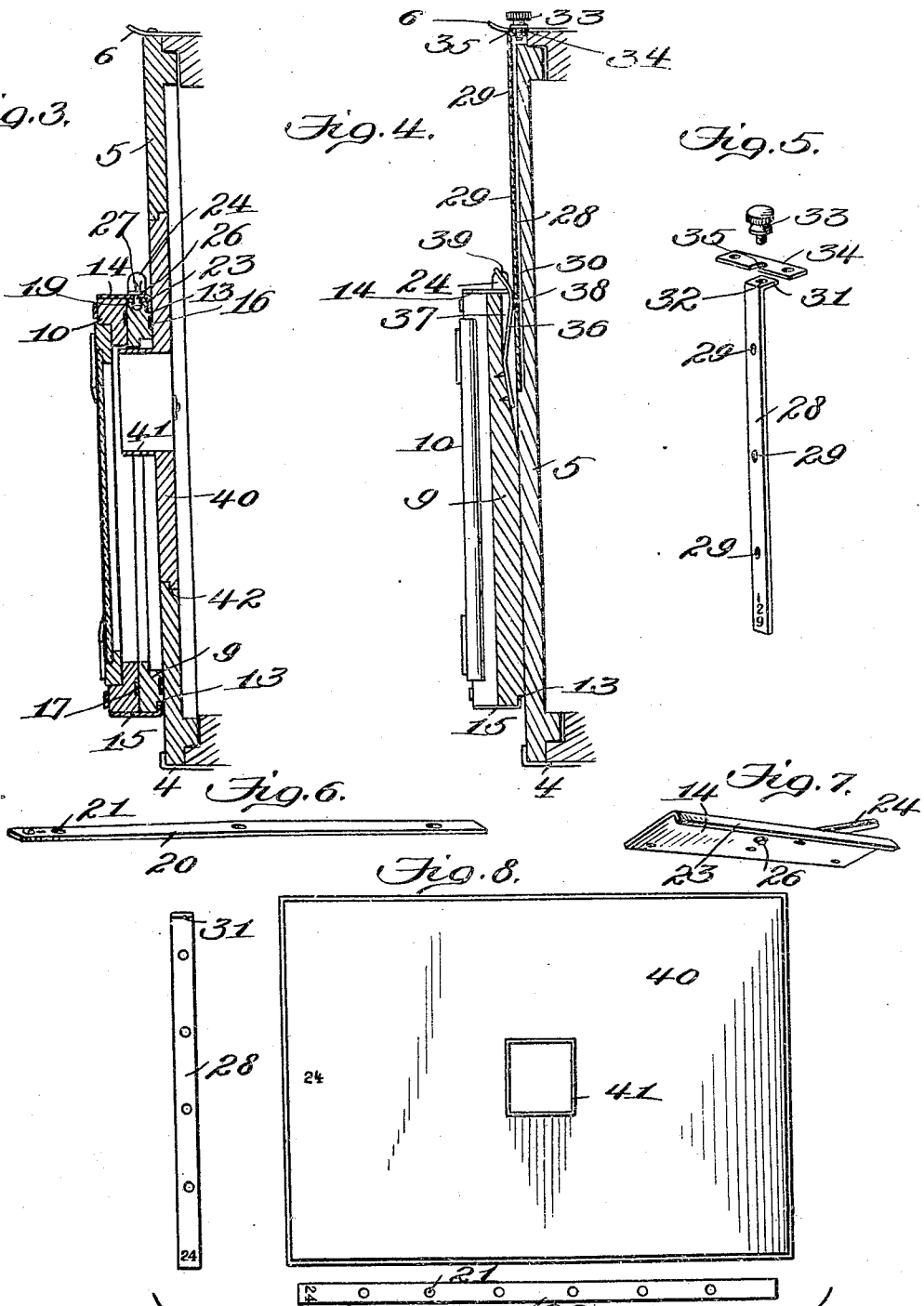

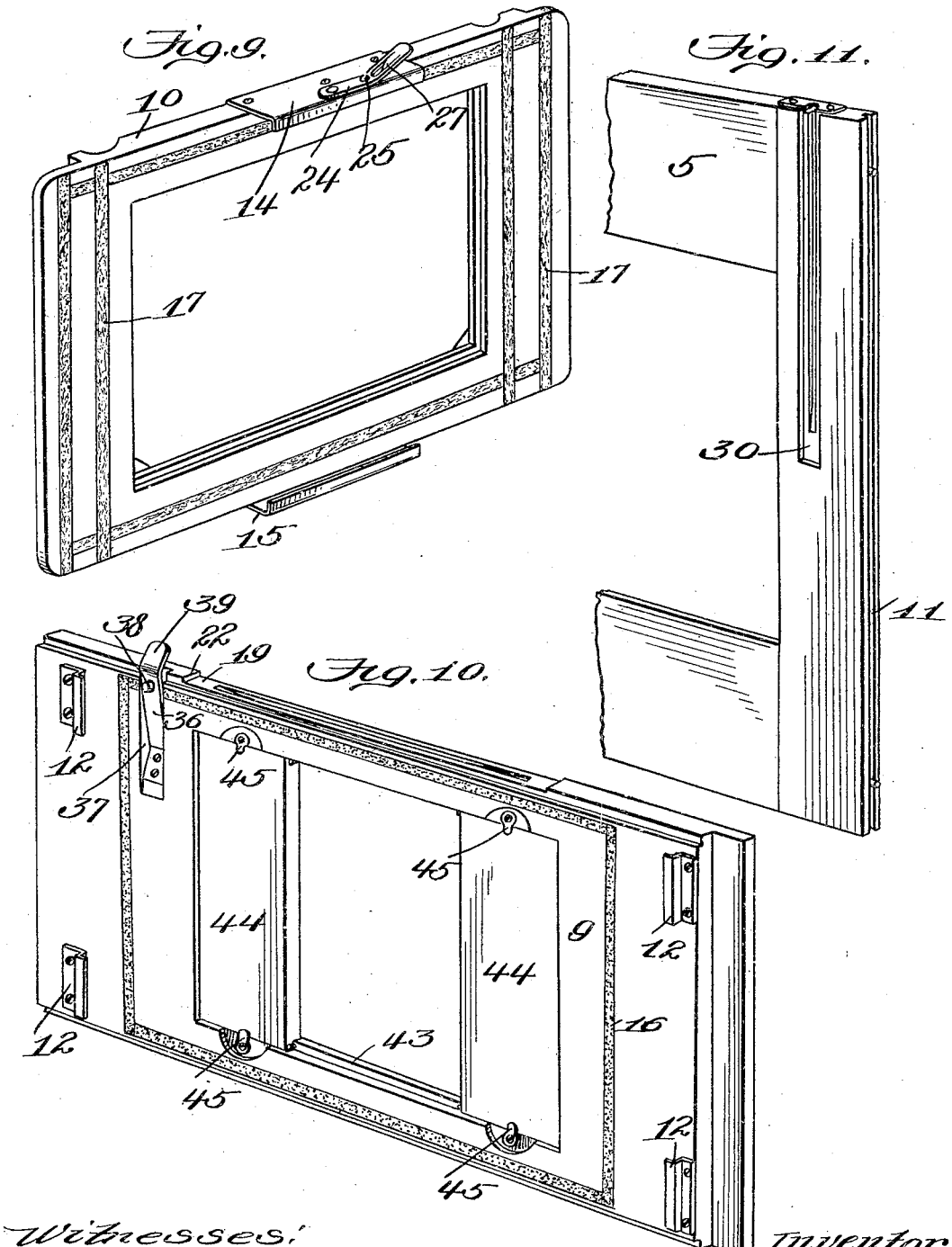

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

MULTIPLYING-BACK FOR CAMERAS.

953,005.  Specification of Letters Patent.  Patented Mar. 22, 1910.

Application filed January 28, 1909. Serial No. 474,711.

*To all whom it may concern:*

Be it known that I, JOSEPH GODDARD, a citizen of the United States, residing at Rochester, in the county of Monroe and State of New York, have invented new and useful Improvements in Multiplying-Backs for Cameras, of which the following is a specification.

The present invention relates to improvements in cameras, and it has for its object primarily to provide an improved multiplying back which may be readily attached to the camera and is simple in construction and capable of being manipulated with the greatest facility whereby a plurality of exposures may be made on a single plate or other sensitized medium, said back embodying generally a pair of frames shiftable in angular relation together with coöperating strips which may be changed according to the different numbers of exposures to be made on each plate, these strips being so constructed and mounted that they may be readily applied and removed with respect to the corresponding frames and, in operation, be made to coöperate with catches or stops whereby the dividing of each plate into the desired number of exposures may be effected automatically and with certainty.

A further object of the invention is to provide an improved multiplying back of this character which is capable of being applied directly and reversibly to the ordinary view camera, the multiplying back being square or rectangular and of the same size and shape as the camera box so that it covers the back of the camera box. It is compact and it presents a neat appearance when so applied to the camera.

To these and other ends, the invention consists in certain improvements, and combination and arrangements of parts, all as will be hereinafter more fully described, the novel features being pointed out particularly in the claims at the end of the specification.

In the accompanying drawing: Figure 1 is a rear elevation of a view camera equipped with a multiplying back constructed in accordance with the present invention; Fig. 2 represents a partial plan view of the camera showing the back applied thereto as in Fig. 1; Fig. 3 represents a vertical section through the back on the line 3—3 of Fig. 1, the vertically movable frame being shifted to its lowermost position; Fig. 4 represents a vertical section through the back on the line 4—4 of Fig. 1; Fig. 5 is a perspective view of one of the interchangeable strips for dividing the plate vertically, the securing screw and coöperating plate being shown; Fig. 6 is a perspective view of one of the interchangeable strips which fits upon the horizontally movable frame and serves to divide the plate horizontally; Fig. 7 is a perspective view of the catch which is carried by the horizontally movable frame and coöperates with the strip as shown in Fig. 6; Fig. 8 is a diagrammatic view of one of the masks and the two corresponding strips which are used for dividing the plate both horizontally and vertically when such mask is used; and Figs. 9, 10 and 11 are perspective views of the elements of the device separated from one another.

Similar parts are designated by the same reference characters in the several views.

Multiplying backs constructed in accordance with the present invention are capable of use generally in connection with cameras of various kinds, although they are especially adapted for use in connection with the ordinary view camera and I have shown the invention so applied in the present instance. It will be understood, however, that in the drawing I have shown but one embodiment of the invention as an example, and that certain modifications and changes may be made in the detail construction and arrangement of the parts whereby the invention may be applied to the best advantage in each particular case.

In the present instance, a view camera is shown which consists of a camera box 1, the extensible bellows 2 and the bed 3 on which the camera front is slidable for focusing purposes. The camera box is open at the rear and it is square whereby the multiplying back may be reversibly mounted thereon. In the present instance, one of the edges of the camera box may be provided with clips 4 into which may be fitted a corresponding edge of the board 5 which serves as a carrier upon which the multiplying mechanism is mounted, and the opposite or top edge of the camera box is provided with spring catches 6 which are adapted to detachably engage locking pins 7 which project from the corresponding edge of the board 5. By means of these catches and clips, the board 5 may be attached to the camera in two different positions at right angles to one another, one of the vertical or adjacent edges for the board 5 being provided for this purpose with an additional pair of pins 8 which are adapted to interchangeably engage the catches 6. The board 5 is preferably provided with a forwardly projecting flange to fit into a corresponding rabbet in the rear of the camera box whereby a light-tight joint may be obtained at this point and a proper registration of the back with reference to the camera may be insured.

On the board 5 are mounted a pair of sliding frames 9 and 10, the frame 9 being slidable vertically on the board 5 while the frame 10 is carried by the frame 9 and is slidable horizontally thereon. Any suitable means may be employed for guiding these two frames in their respective angular directions, the opposite vertical edges of the board 5 in the present instance being provided with grooves 11 in which slide flanged cleats 12 which are secured adjacent to the vertical edges of the frame 9, and the frame 10 is guided by means of the grooves 13 which are formed in the top and bottom edges of the frame 9 and with which coöperate the upturned and downturned flanges of the guiding plates 14 and 15 which are suitably secured to the top and bottom of the horizontally movable frame 10. The frame 9 fits closely against the rear face of the board 5 and in order to prevent the entrance of light through the space between this frame and said board, a sealing strip 16 of felt or other appropriate material may be inserted, this strip permitting the requisite shifting movements of the frame, although a light-tight joint is maintained. A sealing strip 17 is provided between the frame 10 and the frame 9 for a similar purpose. The frame 10 which is shiftable on the frame 9 is adapted to receive the plate holder or other sensitized mediums, this frame being provided in the present instance with a spring-pressed focusing screen 18 which is provided with a ground glass whereby the focusing of the camera may be facilitated and the plate holder may be readily interposed between this focusing screen and the rear of the frame 10 when it is desirable to make an exposure, the focusing screen being pressed rearwardly while the plate holder is in position. I have shown a construction whereby plate holders of the ordinary kind may be received. It will be understood, however, that any appropriate means may be used to receive the plate holder or other sensitized medium.

The dividing of each plate into different numbers of exposures and the proper positioning of the various exposures upon each plate are accomplished in the present instance by the use of interchangeably mounted strips and coöperative catches or stops carried by the respective frames, one of these strips being provided for each frame whereby the movement thereof in shifting the plate holder may be suitably controlled. In the present instance, the upper edge of the frame 9 is provided with a recess 19, this recess being immediately adjacent to the guiding groove 13 and of a depth and width equivalent to the corresponding dimensions of the strip 20 which may therefore be fitted therein. A set of these strips 20 are provided having apertures or notches 21 therein of a number corresponding to the number of exposures that are to be made lengthwise of the plate, all of these strips being of the same size so that they may interchangeably fit into the recess 19. This recess in the upper edge of the frame 9 forms a space between the groove 13 and the forward edge of the said frame in which the appropriate strip 20 is seated, the ends of the strip coöperating with the abutments or end walls 22 of the recess so as to prevent endwise movement of the strip with respect to the frame on which it is mounted. In order to insure the proper seating of the strip within this recess, it is preferably bowed upwardly in the center, the strip being composed of resilient or yieldable material whereby its central portion may be pressed downwardly as the guiding plate 14 passes thereover. The flange 23 on this guiding plate which coöperates with the groove 13 engages an edge of the strip 20 so as to confine it within its recess, and this guiding plate also carries an automatic catch or stop 24 which is mounted to rock vertically on the upper side of the said guiding plate by means of the pin 25 which loosely engages it, and one end of this catch is provided with a pin or projection 26 which extends through an aperture in the plate 14 and is adapted to successively engage the apertures or notches in the strip 20 during the traversing movements of the frame 10. This pin or projection is automatically operated to engage the apertures in the strip 20 by means of a spring 27 which in the present instance is punched from the body portion of the catch 24 in the form of a tongue which bears upon the upper side of the guiding plate 14, as shown in Fig. 9. Whenever it is desirable to remove one of the strips 20 and to substitute another in place thereof, the frame 10 is shifted to an extreme position at one side of the camera back whereby the guiding plate 14 will uncover the strip and will thus permit its removal and the substitution of another.

The division of the plate vertically is controlled by a strip 28, a set of these being provided having apertures or notches 29 corresponding in number to the number of rows of exposures that are to be made in a direction vertically of the plate. Each of the strips 28 is a duplicate excepting the number of apertures and notches that are formed therein, each of these strips being seated in a correspondingly shaped recess 30 which is formed in the rear face of the board 5, the upper end of the strip having its upper end 31 turned forwardly at right angles to the body portion of the strip and, in the present instance, this forwardly turned end is threaded as at 32 to receive a securing screw 33, a fastening plate 34 being secured to the top edge of the board 5 and is provided with a rearwardly opening slot 35 into which the stem of the screw 33 may be introduced while the threaded end of said screw engages the threaded opening 32 on the strip, this screw thereby serving as a handle whereby one strip 28 may be readily removed and another may be substituted. The body portion of this strip 28 may also be bowed in the center so as to insure a proper seating of its ends in the coöperating recess 30 which is provided in the board 5. An automatic catch 36 is mounted in a recess 37 formed on the rear side of the frame 9, this catch having a pin or projection 38 to coöperate successively with the apertures 29 during the traversing movements of said frame. The pin or projection 38 is normally pressed into engagement with the strip 28 by a spring action, the body portion of the catch in the present instance being composed of resilient material one end of which is fixed to the frame 9 so as to give the catch a normal tendency to engage the said strip, and the upper end of the catch projects above the upper edge of the frame 9 so as to provide a finger-piece 39 whereby the catch may be released to permit its shifting from one aperture in the strip 28 to another aperture therein.

In order to facilitate the selection of the appropriate strips so as to produce the desired number of exposures upon a plate, these strips are preferably provided with identifying characters, these characters in the present instance being numerals which indicate the numbers of exposures which may be made upon a plate by the use of such strips. For instance, in Fig. 8, the strip 28 is provided with the numeral 24 and the corresponding strip 20 is provided with the same numeral which indicates that these two strips are to be selected when it is desirable to produce twenty-four exposures upon a plate.

In order to produce the different numbers of exposures upon the plates, a set of masks 40 are provided each having an exposure opening 41 of a size corresponding to a fraction of the number of exposures that are to be made upon the plate, and each of these masks is adapted to removably fit a rabbeted opening 42 formed in the board 5, suitable catches being provided for detachably securing them in position whereby one mask may be readily substituted for another. The frame 9 is also provided with a rabbeted opening 43 which is of a size corresponding to the full size of the plate. In making single exposures that occupy the entire plate, the frames 9 and 10 will be centered with respect to the optical axis of the camera. When these frames are so positioned, the openings 42 and 43 are also centered and register. In making a full size exposure, the mask 40 will also be removed. In producing a plurality of exposures upon the plate, however, a pair of shields 44 are preferably fitted into the opposite sides of the opening 43 and are detachably secured in position by means of the turn-buttons 45, these shields protecting those ends of the plate which are not being exposed.

In operating a multiplying attachment of the class described, the plate holder is inserted between the rear of the frame 10 and the focusing screen 18. The catches 24 and 36 are then released and the frames 9 and 10 are shifted so as to bring one corner of the plate into alinement with the optical axis of the camera lens, it being assumed that the appropriate strips 20 and 28 have been selected and fitted into their respective recesses. When the plate is so positioned, an exposure is properly made, and after the lens has been covered, either of the frames 9 or 10 may be shifted into the next exposing position. Usually, the frame 10 is first shifted so as to complete a horizontal row of exposures, and this is accomplished by releasing the catch 24 and shifting the frame 10, for instance, to the right, its motion being automatically arrested at the moment the plate is properly positioned by the pin on the catch 24 springing into the next aperture 21 in the strip 20, this operation being repeated until a horizontal row of exposures has been completed. In order to shift the plate to make another horizontal row of exposures, the catch 36 is next released and the frame 9 is moved vertically until the pin or projection on such catch springs into the next aperture 29 in the strip 28 at which time the frame 9 will be appropriately positioned for the next horizontal row of exposures. This operation is repeated until the desired number of exposures has been made upon the plate. In making a single exposure, the frames 9 and 10, as previously stated, are positioned centrally, such strips 20 and 28 being selected which contain locking apertures midway of their ends.

In some instances, it may be desirable or necessary to reverse the position of the attachment whereby the longer dimension of the plate may stand vertically. In order to accomplish this, it is only necessary to lift the spring catches 6, remove the board 5 which carries the multiplying mechanism, and then give the attachment a quarter rotation, the pins 8 which were formerly located at one of the vertical edges of the attachment being thereby brought into position to be engaged by the spring catches 6 at the top of the camera box. When these pins 8 are engaged by the catches, the attachment will be secured to the camera so that the position of the plate holder is reversed, that is to say, its longer dimension stands vertically instead of horizontally, as previously.

A multiplying attachment constructed in accordance with the present invention is comparatively simple in its construction and, by providing the coöperating spring catches, the plate may be automatically divided into the desired number of exposures, and these strips may be interchanged with the greatest facility. In the present instance, the attachment is of the same size and shape as the rear of the camera box so that it is not only reversible with respect thereto, but it is compact and it presents a neat appearance.

What is claimed is:

1. A multiplying back for cameras comprising a part adapted to be applied to the camera, a pair of frames carried thereby and shiftable in different angular directions, one of the frames being provided with a longitudinal recess having abutments spaced in the direction of movement of such frame, an exposure-controlling device removably mounted in said recess and coöperative with the abutments thereof to prevent longitudinal movement of said device in either direction, and a stop carried by the other frame and coöperative with said exposure-controlling device for positioning the frames for a plurality of exposures.

2. A multiplying back for cameras comprising a part adapted to be applied to the camera, a pair of frames carried by said part and shiftable relatively in different angular directions, one of said frames being provided with a longitudinal recess having at its ends abutments, an exposure-controlling device embodying a strip divided according to the desired number of exposures to be made and removably mounted in said recess and coöperating at its ends with the abutments thereof to prevent longitudinal movement of the strip in either direction, and a stop coöperative with said divided strip for holding the respective frames in different exposing positions.

3. A multiplying attachment for cameras comprising a back adapted to be applied to the camera box, frames carried by said back and shiftable relatively in different angular directions, one of said frames having a longitudinal recess provided with abutments at its ends, means on one of said frames for containing a sensitized medium, and an exposure controlling device removably mounted in said recess for relatively positioning said frames to effect a plurality of exposures of the sensitized medium, each exposure controlling device comprising a removably mounted apertured strip held from longitudinal movement in both directions and a spring catch coöperative therewith.

4. A multiplying back for cameras comprising a board adapted to be attached to the camera, a pair of frames shiftable in different angular directions, one of the frames being guided to move on said back and the other frame being guided to move on the frame first mentioned and adapted to contain a sensitized medium, a recess being formed in one of said frames having abutments at its ends, an exposure controlling device comprising a strip removably seated in said recess in one of the frames so as to be held from longitudinal movement in either direction and divided according to the desired number of exposures, and a catch attached to the other frame and coöperative with said strip.

5. A multiplying back for cameras comprising a part adapted to be supported at the rear of a camera and provided with a recess having abutments at its opposite ends, a frame shiftable relatively to said part and having means for supporting a sensitized medium, and an exposure controlling device consisting of a strip removably mounted in said recess and coöperating at its ends with the abutments thereof so as to be held from longitudinal movement in either direction and extending in the direction of relative adjustment, and a catch attached to the other part and coöperative with said strip.

6. A multiplying back for cameras comprising a pair of relatively adjustable parts, one of said parts being provided with a recess extending in the direction of relative adjustment between the parts and provided with an abutment at each end, means on one of the parts for supporting a sensitized medium, and an exposure controlling device embodying a strip removably seated in the said recess so as to be positively held from longitudinal movement in either direction and divided according to the desired number of exposures to be made, and a catch carried by the other part and coöperative with said strip whereby said parts may be held in different exposing positions.

7. A multiplying back for cameras comprising relatively adjustable parts, one of said parts having a recess elongated in the direction of relative adjustment, means on one of the parts for supporting a sensitized medium, and an exposure controlling device embodying a strip removably seated in said recess and having an inherent action tending to retain its ends in such recess, said strip being divided according to the desired number of exposures to be made, and a catch coöperative with said strip whereby said parts may be retained in different relative positions.

8. A multiplying back for cameras comprising a board adapted for application to a camera, a pair of frames shiftable in different angular directions, one of said frames being intermediate said board and the other frame serving as a support for the latter, means on one of the frames for containing a sensitized medium, the intermediate frame having a recess in one edge elongated in the direction of relative adjustment of the frames, guides connecting the frames, one of said guides overlying the said recess, an exposure controlling strip seated removably in the said recess and retained in position by one of said guides, and a catch carried by one of said guides and coöperative with said strip for retaining said frames in different relative exposing positions.

9. A multiplying back for cameras comprising a board adapted to be applied to a camera, a frame shiftable thereon, means carried by said frame for supporting a sensitized medium, and an exposure controlling device interposed between said frame and board and consisting of a strip having a number of apertures corresponding to the number of exposures to be made in one direction upon the sensitized medium, a device for detachably securing said strip to one of the parts, and a catch carried by the other part and coöperative with said strip for retaining said frame in different exposing positions.

10. A multiplying back for cameras comprising a board adapted to be applied to a camera and provided with an elongated recess, a frame shiftable on said board in a direction longitudinally of said recess and adapted to carry a sensitized medium, and an exposure controlling device between said board and frame comprising a strip removably seated in said recess and having a laterally bent end, a clamping device attached to said end and coöperative therewith for detachably securing said strip to said board, and a catch carried by the frame and coöperative with said strip for positioning said frame for a plurality of exposures.

11. The combination of a camera box provided with a rectangular opening in its rear, and a multiplying back embodying a board reversibly mounted on the camera box to cover the said opening therein and having grooves formed in opposite edges thereof, and a pair of frames relatively shiftable in different angular paths, one of said frames having guiding devices which coöperate with the grooved edges of said board, and exposure-controlling devices for positioning the frames relatively to each other and to said board.

12. The combination of a view camera having an angularly shaped box provided with an opening at its rear, and a multiplying back comprising a board corresponding in size and angular shape to the camera box and reversibly and detachably fitting the same, said board being provided with grooves in opposite edges thereof, and a pair of frames relatively adjustable in different angular directions, one of the frames having guiding devices coöperative with the grooves on said board to permit the frames to be shifted in a direction longitudinally of said grooves, an exposure-controlling device attached to said board and having apertures spaced longitudinally thereof, and a stop movable with one of the frames and coöperative with the exposure-controlling device for automatically positioning the frames relatively to said board.

In testimony whereof I have hereunto set my hand in presence of two subscribing witnesses.

JOSEPH GODDARD.

Witnesses:
 Geo. Gaymier,
 J. A. Dyer.